US00RE35959E

United States Patent [19]

Willis et al.

[11] E Patent Number: Re. 35,959

[45] Reissued Date of Patent: Nov. 17, 1998

[54] MAIL BOX

[75] Inventors: Tucker Willis; James Cinquemani, Jr., both of Dallas, Tex.

[73] Assignee: Chaenomeles, Inc. Dallas, Tex.

[21] Appl. No.: 49,241

[22] Filed: Dec. 15, 1995

Related U.S. Patent Documents

Reissue of:

[64] Patent No.: Des. 354,829
Issued: Jan. 24, 1995
Appl. No.: 14,054
Filed: Nov. 4, 1993

[51] LOC (6) Cl. ..... 99-00

[52] U.S. Cl. ..... D99/33

[58] Field of Search ..... D99/29, 32, 33, D99/34; 232/17, 24, 34, 35, 37

[56] References Cited

U.S. PATENT DOCUMENTS

| | | | |
|---|---|---|---|
| D. 32,376 | 3/1900 | McKinster . | |
| D. 213,738 | 4/1969 | Andis . | |
| D. 218,490 | 8/1970 | Blumberg . | |
| D. 229,981 | 1/1974 | Adamson | D99/29 |
| D. 344,392 | 2/1994 | Gardner | D99/29 |
| D. 378,463 | 3/1997 | Willis et al. | D99/33 |
| 674,147 | 5/1901 | Wirt | D99/29 X |
| 715,240 | 12/1902 | Birely | D99/29 X |
| 724,092 | 3/1903 | Forney . | |
| 725,080 | 4/1903 | Henry | D99/33 X |
| 2,578,691 | 12/1951 | Gieseler . | |
| 2,578,692 | 12/1951 | Gieseler . | |
| 2,578,693 | 12/1951 | Gieseler . | |
| 2,873,062 | 2/1959 | Cornell . | |
| 3,602,423 | 8/1971 | Corkery . | |

*Primary Examiner*—Paula A. Mortimer
*Attorney, Agent, or Firm*—Jenkens & Gilchrist, a Professional Corporation

[57] CLAIM

The ornamental design for the mail box, as shown and described.

DESCRIPTION

FIG. 1 is a perspective view of the mail box;
FIG. 2 is a front elevational view of the mail box;
FIG. 3 is a side elevational view taken from the right side of the mail box which is [identical to the] *a mirror image of a* side elevational view taken from the left side of the mail box;
FIG. 4 is a rear elevational view of the mail box;
FIG. 5 is a top plan view of the mail box; and,
FIG. 6 is a bottom plan view of the mail box.

1 Claim, 2 Drawing Sheets

Figure 1:
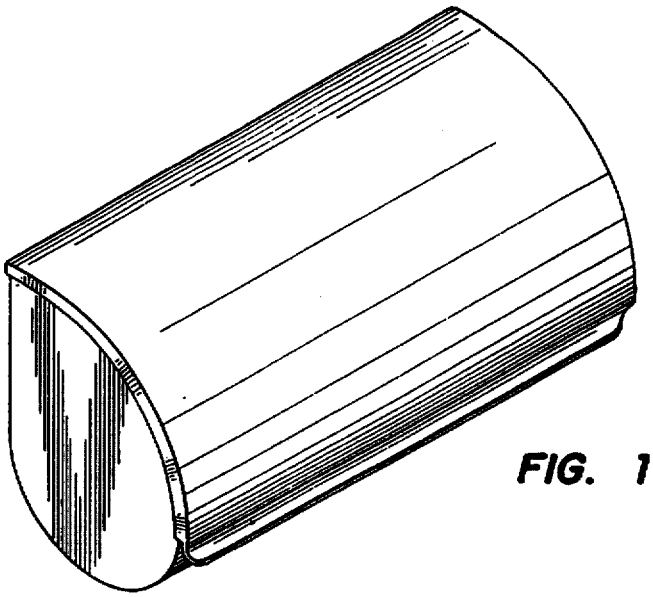
Figure 2:
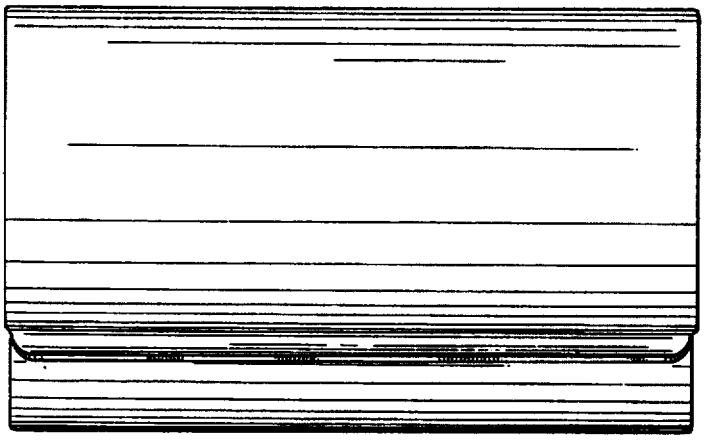
Figure 3:
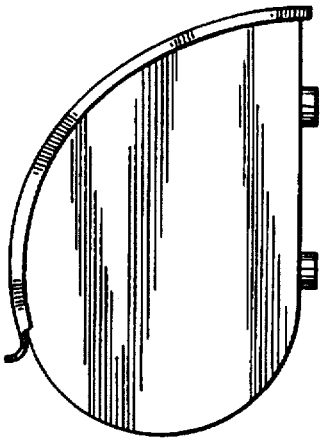
Figure 4:
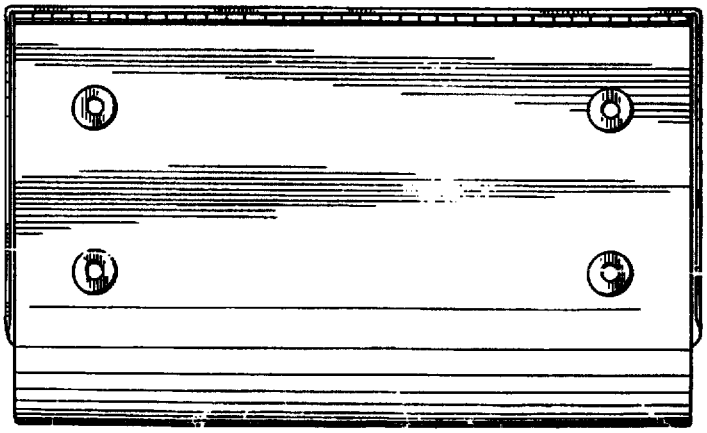
Figure 5:
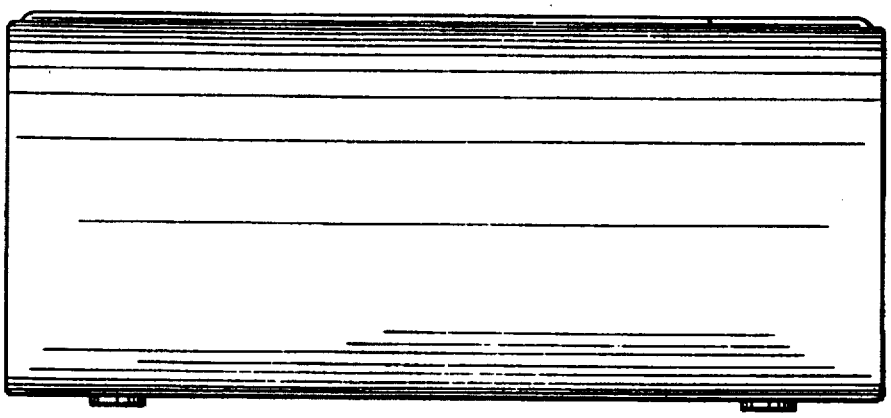
Figure 6:
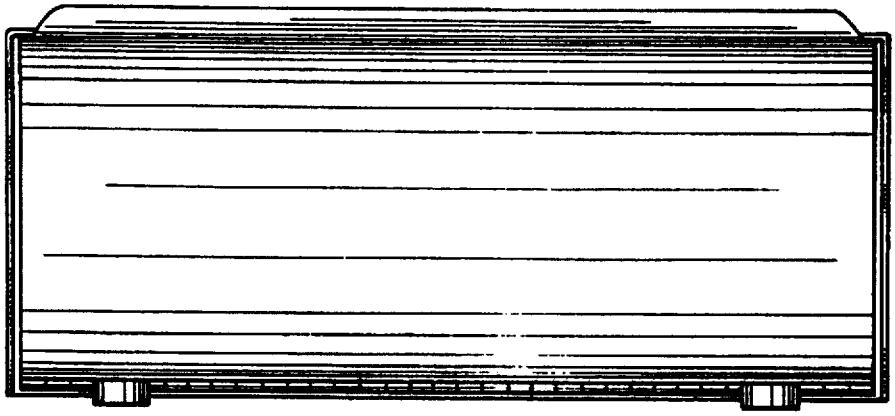

Matter enclosed in heavy brackets [ ] appears in the original patent, but forms no part of this reissue; matter printed in italics indicates the additions made by reissue.